US009717009B2

(12) United States Patent
Zhang et al.

(10) Patent No.: US 9,717,009 B2
(45) Date of Patent: Jul. 25, 2017

(54) METHODS AND APPARATUS FOR PROVIDING MEASUREMENT INFORMATION

(75) Inventors: Yi Zhang, Beijing (CN); Guillaume Decarreau, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/348,641

(22) PCT Filed: Sep. 30, 2011

(86) PCT No.: PCT/CN2011/080506
§ 371 (c)(1),
(2), (4) Date: Mar. 31, 2014

(87) PCT Pub. No.: WO2013/044523
PCT Pub. Date: Apr. 4, 2013

(65) Prior Publication Data
US 2014/0228018 A1     Aug. 14, 2014

(51) Int. Cl.
*H04W 24/08*     (2009.01)
*H04W 36/30*     (2009.01)
*H04W 36/00*     (2009.01)
*H04W 76/02*     (2009.01)

(52) U.S. Cl.
CPC ........... *H04W 24/08* (2013.01); *H04W 36/30* (2013.01); *H04W 36/0055* (2013.01); *H04W 76/027* (2013.01)

(58) Field of Classification Search
CPC ..................................................... H04W 24/08
See application file for complete search history.

(56) References Cited

U.S. PATENT DOCUMENTS

| 8,838,046 B2 * | 9/2014 | Fu et al. .......................... 455/88 |
| 2011/0242969 A1 * | 10/2011 | Dayal et al. ................... 370/225 |
| 2011/0250880 A1 * | 10/2011 | Olsson ................ H04W 76/027 455/423 |
| 2012/0020231 A1 * | 1/2012 | Chen et al. .................... 370/252 |
| 2012/0207040 A1 * | 8/2012 | Comsa et al. ................. 370/252 |

(Continued)

FOREIGN PATENT DOCUMENTS

| CN | 101836478 A | 9/2010 |
| CN | 102036243 A | 4/2011 |

(Continued)

OTHER PUBLICATIONS

3GPP TS 37.320 V10.0.0 (Dec. 2010); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

(Continued)

*Primary Examiner* — Nathan Mitchell
(74) *Attorney, Agent, or Firm* — Harrington & Smith

(57) ABSTRACT

A method including: determining in device co-existence interference during a communications failure of the device; and determining a failure report generation operation dependent on determining in device co-existence interference during the communications failure.

21 Claims, 7 Drawing Sheets

(56) References Cited

U.S. PATENT DOCUMENTS

| | | | | |
|---|---|---|---|---|
| 2012/0276936 A1* | 11/2012 | Ahn et al. | | 455/501 |
| 2013/0029704 A1* | 1/2013 | Koo et al. | | 455/501 |
| 2013/0201947 A1* | 8/2013 | Wong | | 370/329 |
| 2013/0303214 A1* | 11/2013 | Ahmadi | | 455/501 |
| 2014/0010205 A1* | 1/2014 | Sebire | | 370/331 |
| 2014/0050102 A1* | 2/2014 | Lee et al. | | 370/242 |
| 2014/0335855 A1* | 11/2014 | Lee et al. | | 455/426.1 |

FOREIGN PATENT DOCUMENTS

| | | |
|---|---|---|
| CN | 102143521 A | 8/2011 |
| CN | 102170644 A | 8/2011 |

OTHER PUBLICATIONS

R2-112909; Pantech; "RLF handling due to IDC"; 3GPP TSG RAN WG2 Meeting #74; Barcelona, Spain, May 9-13, 2011.

* cited by examiner

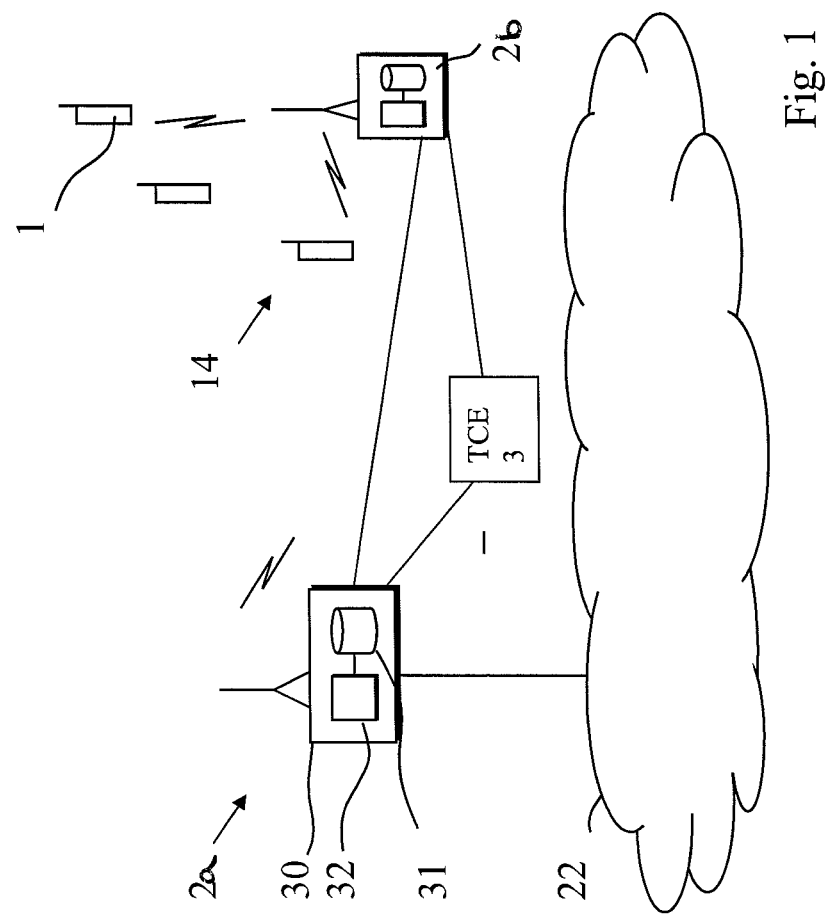

METHODS AND APPARATUS FOR PROVIDING MEASUREMENT INFORMATION

FIELD OF THE INVENTION

Some embodiments relate to methods and apparatus and in particular but not exclusively to methods and apparatus for the reporting of measurement information.

BACKGROUND OF THE INVENTION

Communication between two or more entities such as mobile communication devices and other stations can be facilitated by a communication system. A communication system and compatible communication devices typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. In wireless systems a communication device thus typically provides a transceiver station that can communicate with the access node and/or another communications device. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B.

A communication system can be accessed by means of an appropriate communication device. A communication device of a user is often referred to as user equipment (UE). A communication device is provided with an appropriate signal receiving and transmitting arrangement for enabling communications with other parties. A feature of wireless communication devices is that they offer mobility for the users thereof. A mobile communication device, or mobile device for short, may also be transferred, or handed over, from a base station to another and even between base stations belonging to different systems.

The communication devices or user equipment may make measurements which are reported to the base station. These measurements may be used to monitor network performance.

STATEMENT OF APPLICATION

According to a first aspect, there is provided a method comprising: determining in device co-existence interference during a communications failure of the device; and determining a failure report generation operation dependent on determining in device co-existence interference during the communications failure.

Determining a failure report generation operation may comprise: generating a failure report comprising at least one failure variable.

At least one failure variable may comprise at least one of: a registered public land mobile network (RPLMN) identity; a last serving cell reference signal received power (RSRP); a last serving cell reference signal received quality (RSRQ); at least one neighbouring cell identity; measurement reports (RSRP/RSRQ) for the neighbouring cell(s); an identity of the cell where a radio link failure is detected or a target cell of a failed handover; and an indentity of a cell in which a re-establishment attempt was made after a radio link failure or a handover failure.

The at least one failure variable may comprise an indicator associated with the determination of in device co-existence interference during the communications failure of the device.

The method may further comprise transmitting the failure report to a further device.

Determining the failure report generation operation dependent on determining in device co-existence interference during the communications failure may further comprise: requesting a radio link reconnection; amending a failure report available indicator to reset and/or remove the report information available indicator; and/or suppressing the transmission of the failure report available indicator.

Determining the failure report generation operation dependent on determining in device co-existence interference during the communications failure may further comprise: requesting a radio link reconnection; extending a failure report available indicator by a bit, the bit configured to indicate the determination of in device co-existence interference during the communications failure of the device; and transmitting the amended failure report available indicator.

Determining the failure report generation operation dependent on determining in device co-existence interference during the communications failure may further comprise: requesting a radio link reconnection; generating a in device co-existence interference indicator; and transmitting the in device co-existence interference indicator with a failure report available indicator.

The failure report available indicator may be within a radio resource control connection complete message.

The radio resource control connection complete message may comprise at least one of: a RRCConnectionRestablishmentComplete message; a RRCConnectionSetUpComplete message; and a RRCConnectionReconfigurationComplete message.

Determining a failure report generation operation dependent on determining in device co-existence interference during the communications failure may further comprise stopping generation and storage of any failure report variable dependent on determining in device co-existence interference during the communications failure.

Determining a failure report generation operation dependent on determining in device co-existence interference during the communications failure may be further dependent on a reporting indicator from a further device.

According to a second aspect there is provided a method comprising: receiving at a device a failure report; determining from the failure report comprising at least one failure variable, the at least one failure variable comprising an indicator associated with the determination of in device co-existence interference during a communications failure of a further device; processing the failure report dependent on the determination of the at least one failure variable comprising an indicator associated with the determination of in device co-existence interference during a communications failure of a further device.

According to a third aspect there is provided a method comprising: receiving a failure report available indicator from a further device, wherein the failure report indicator comprises an in device co-existence interference indicator; and requesting a failure report from the further device dependent on the in device co-existence interference indicator state.

According to a fourth aspect there is provided a method comprising: receiving a failure report available indicator from a further device; receiving an in device co-existence interference indicator from the further device; and requesting a failure report from the further device dependent on the in device co-existence interference indicator state and the failure report available indicator state.

The failure report available indicator may be within a radio resource control connection complete message.

The radio resource control connection complete message may comprise at least one of: a RRCConnectionRestablishmentComplete message;
a RRCConnectionSetUpComplete message; and
a RRCConnectionReconfigurationComplete message.

The communications failure may comprise at least one of: a radio link failure; and a handover failure.

The failure report may comprise a radio link failure (RFL) report.

A computer program comprising a plurality of computer executable instructions which when run may be configured to perform the method as discussed herein.

According to a fifth aspect there is provided an electronic device comprising: means for determining in device co-existence interference during a communications failure of the device; and means for determining a failure report generation operation dependent on determining in device co-existence interference during the communications failure.

The means for determining a failure report generation operation may comprise: means for generating a failure report comprising at least one failure variable.

The at least one failure variable may comprise at least one of: a registered public land mobile network (RPLMN) identity; a last serving cell reference signal received power (RSRP); a last serving cell reference signal received quality (RSRQ); at least one neighbouring cell identity; at least one measurement report (RSRP/RSRQ) for the neighbouring cell(s); an identity of the cell where a radio link failure is detected or a target cell of a failed handover; and an indentity of a cell in which a re-establishment attempt was made after a radio link failure or a handover failure.

The at least one failure variable may comprise an indicator associated with the determination of in device co-existence interference during the communications failure of the device.

The electronic device may further comprise means for transmitting the failure report to a further device.

The means for determining the failure report generation operation dependent on determining in device co-existence interference during the communications failure may further comprise: means for requesting a radio link reconnection; means for amending a failure report available indicator to reset and/or remove the report information available indicator; and/or means for suppressing the transmission of the failure report available indicator.

The means for determining the failure report generation operation dependent on determining in device co-existence interference during the communications failure may further comprise: means for requesting a radio link reconnection; means for extending a failure report available indicator by a bit, the bit configured to indicate the determination of in device co-existence interference during the communications failure of the device; and means for transmitting the amended failure report available indicator.

The means for determining the failure report generation operation dependent on determining in device co-existence interference during the communications failure may further comprise: means for requesting a radio link reconnection; means for generating a in device co-existence interference indicator; and means for transmitting the in device co-existence interference indicator with a failure report available indicator.

The failure report available indicator may be within a radio resource control connection complete message.

The radio resource control connection complete message may comprise at least one of: a RRCConnectionRestablishmentComplete message;
a RRCConnectionSetUpComplete message; and
a RRCConnectionReconfigurationComplete message.

The means for determining a failure report generation operation dependent on determining in device co-existence interference during the communications failure may further comprise means for stopping generation and storage of any failure report variable dependent on determining in device co-existence interference during the communications failure.

The means for determining a failure report generation operation dependent on determining in device co-existence interference during the communications failure may further comprise means for receiving a reporting indicator from a further device and means for determining the state of a reporting indicator received from a further device.

According to a sixth aspect there is provided an electronic device comprising: means for receiving at a device a failure report; means for determining from the failure report comprising at least one failure variable, the at least one failure variable comprising an indicator associated with the determination of in device co-existence interference during a communications failure of a further device; and means for processing the failure report dependent on the determination of the at least one failure variable comprising an indicator associated with the determination of in device co-existence interference during a communications failure of a further device.

According to a seventh aspect there is provided an electronic device comprising: means for receiving a failure report available indicator from a further device, wherein the failure report indicator comprises an in device co-existence interference indicator; and means for requesting a failure report from the further device dependent on the in device co-existence interference indicator state.

According to an eighth aspect there is provided an electronic device comprising: means for receiving a failure report available indicator from a further device; means for receiving an in device co-existence interference indicator from the further device; and means for requesting a failure report from the further device dependent on the in device co-existence interference indicator state and the failure report available indicator state.

The failure report available indicator may be within a radio resource control connection complete message.

The radio resource control connection complete message may comprise at least one of: a RRCConnectionRestablishmentComplete message;
a RRCConnectionSetUpComplete message; and
a RRCConnectionReconfigurationComplete message.

The communications failure may comprise at least one of: a radio link failure; and a handover failure.

The failure report may comprise a radio link failure (RFL) report.

The electronic device as discussed herein may be a user equipment.

The electronic device as discussed herein may be a node B and/or enhanced node B.

According to a ninth aspect there is provided an electronic device comprising at least one processor and at least one memory including computer program code, the at least one memory and computer program code configured, with the at least one processor, to cause the device to perform: determining in device co-existence interference during a communications failure of the device; and determining a failure report generation operation dependent on determining in device co-existence interference during the communications failure.

Determining a failure report generation operation may cause the device to perform: generating a failure report comprising at least one failure variable.

The at least one failure variable may comprise at least one of: a registered public land mobile network (RPLMN) identity; a last serving cell reference signal received power (RSRP); a last serving cell reference signal received quality (RSRQ); at least one neighbouring cell identity; at least one measurement report (RSRP/RSRQ) for the neighbouring cell(s); an identity of the cell where a radio link failure is detected or a target cell of a failed handover; and an indentity of a cell in which a re-establishment attempt was made after a radio link failure or a handover failure.

The at least one failure variable may comprise an indicator associated with the determination of in device co-existence interference during the communications failure of the device.

The electronic device may further perform transmitting the failure report to a further device.

Determining the failure report generation operation dependent on determining in device co-existence interference during the communications failure may cause the device to perform: requesting a radio link reconnection; amending a failure report available indicator to reset and/or remove the report information available indicator; and/or suppressing the transmission of the failure report available indicator.

Determining the failure report generation operation dependent on determining in device co-existence interference during the communications failure may cause the device to perform: requesting a radio link reconnection; extending a failure report available indicator by a bit, the bit configured to indicate the determination of in device co-existence interference during the communications failure of the device; and means for transmitting the amended failure report available indicator.

Determining the failure report generation operation dependent on determining in device co-existence interference during the communications failure may cause the device to perform: requesting a radio link reconnection; generating an in device co-existence interference indicator; and transmitting the in device co-existence interference indicator with a failure report available indicator.

The failure report available indicator may be within a radio resource control connection complete message.

The radio resource control connection complete message may comprise at least one of: a RRCConnectionRestablishmentComplete message;
a RRCConnectionSetUpComplete message; and
a RRCConnectionReconfigurationComplete message.

Determining a failure report generation operation dependent on determining in device co-existence interference during the communications failure may cause the device to perform stopping generation and storage of any failure report variable dependent on determining in device co-existence interference during the communications failure.

Determining a failure report generation operation dependent on determining in device co-existence interference during the communications failure may cause the device to perform receiving a reporting indicator from a further device and determining the state of a reporting indicator received from a further device.

According to a tenth aspect there is provided an electronic device comprising at least one processor and at least one memory including computer program code, the at least one memory and computer program code configured, with the at least one processor, to cause the device to perform: receiving at a device a failure report; determining from the failure report comprising at least one failure variable, the at least one failure variable comprising an indicator associated with the determination of in device co-existence interference during a communications failure of a further device; and processing the failure report dependent on the determination of the at least one failure variable comprising an indicator associated with the determination of in device co-existence interference during a communications failure of a further device.

According to an eleventh aspect there is provided an electronic device comprising at least one processor and at least one memory including computer program code, the at least one memory and computer program code configured, with the at least one processor, to cause the device to perform: receiving a failure report available indicator from a further device, wherein the failure report indicator comprises an in device co-existence interference indicator; and requesting a failure report from the further device dependent on the in device co-existence interference indicator state.

According to a twelfth aspect there is provided an electronic device comprising at least one processor and at least one memory including computer program code, the at least one memory and computer program code configured, with the at least one processor, to cause the device to perform: receiving a failure report available indicator from a further device; receiving an in device co-existence interference indicator from the further device; and requesting a failure report from the further device dependent on the in device co-existence interference indicator state and the failure report available indicator state.

The failure report available indicator may be within a radio resource control connection complete message.

The radio resource control connection complete message may comprise at least one of: a RRCConnectionRestablishmentComplete message;
a RRCConnectionSetUpComplete message; and
a RRCConnectionReconfigurationComplete message.

The communications failure may comprise at least one of: a radio link failure; and a handover failure.

The failure report may comprise a radio link failure (RFL) report.

The electronic device as discussed herein may be at least one of a user equipment; a node B; and an enhanced node B.

BRIEF DESCRIPTION OF THE DRAWINGS

Some embodiments will now be described, by way of example only, with reference to the following examples and accompanying drawings in which:

FIG. 1 shows an example of a communication system in which some embodiments may be implemented;

DESCRIPTION OF SOME EMBODIMENTS OF THE APPLICATION

Figure 3:
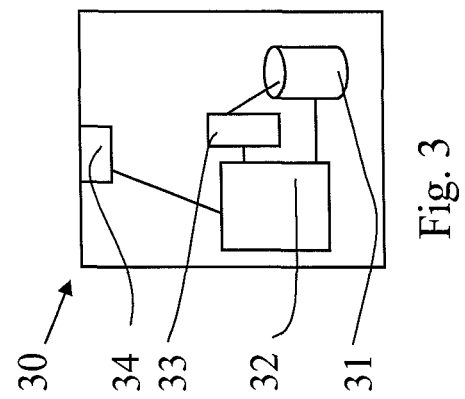
FIG. 3 shows an example of a controller apparatus for a base station.

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 to 4 to assist in understanding of the herein described embodiments.

In a mobile system a user can be provided with a mobile communication device 1 that can be used for accessing various services and/or applications. The access can be provided via an access interface between the mobile user device 1 and an appropriate wireless access system, for example an access node. An access node can be provided by a base station. FIG. 1 shows part of a radio access network (RAN), including a first base station 2a and a second base station 2b. The term base station will be used in the following and is intended to include the use of any of these access nodes or any other suitable access node. The base stations each have a cell associated therewith. The base stations can be connected, for example, by means of a X2 interface.

A TCE (Trace Control Element) 3 is provided. The TCE is arranged to receive MDT (Minimization of Drive Tests) measurement reports from the device to the eNB.

Although not shown, a gateway function between the access systems, a core network 22 and/or another network such as the packet data network may also be provided by means of appropriate gateway nodes. Regardless of the gateway arrangement, a communication device can be connected to an external data network, for example the internet via the access nodes and the base station.

The mobile communication devices can access the communication system based on various access techniques, such as code division multiple access (CDMA), or wideband CDMA (WCDMA), the latter technique being used by some communication systems based on the third Generation Partnership Project (3GPP) specifications. For LTE (long term evolution) and LTE-A (long term evolution-advanced), OFDMA (Orthogonal Frequency Division Multiplexing) in the DL (down link) and single-carrier FDMA in the UL (uplink) can be used. Other examples include time division multiple access (TDMA), frequency division multiple access (FDMA), space division multiple access (SDMA) and so on. In a wireless system a network entity such as a base station provides an access node for communication devices.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB (NB) or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

Regardless of the underlying standard, a mobile communication device can be provided wireless access via at least one base station or similar wireless transceiver node of an access system. An access system may be provided by a cell of a cellular system or another radio service area enabling a communication device to access a communication system. Therefore an access system is hereinafter referred to as a radio service area or cell. Typically a cell is provided by a base station site. A base station site can provide a plurality of sectors, for example three radio sectors, each sector providing a cell or a sub radio service area of a cell.

Figure 2:
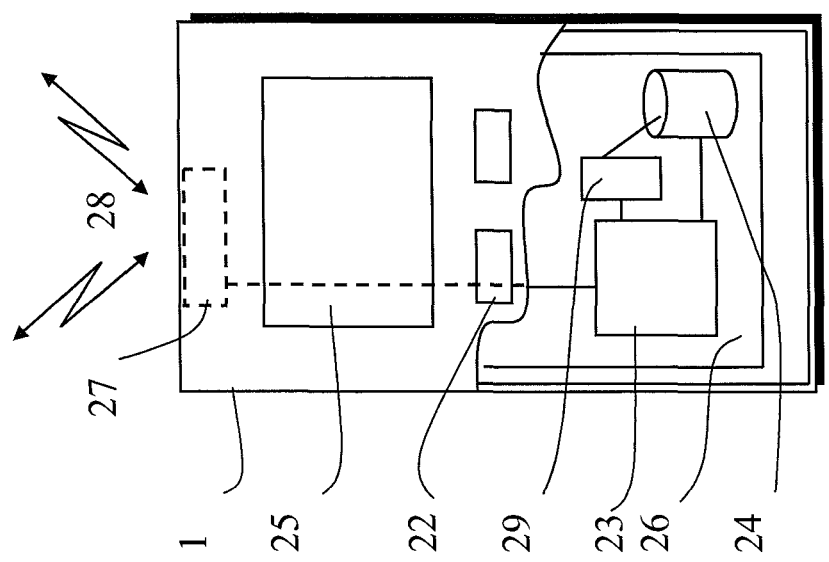
FIG. 2 shows an example of a communication device.

FIG. 2 shows a schematic, partially sectioned view of a communication device 1 that a user can use for communication. Such a communication device is often referred to as user equipment (UE) or terminal. An appropriate communication device may be provided by any device capable of sending and receiving radio signals, mobile or stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The communication device 1 may receive and transmit signals over an air interface 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device.

A communication device is also typically provided with at least one data processing entity 23, at least one memory 24 and other possible components 29 for use in software and hardware aided execution of tasks it is designed to perform, including control of access to and communication with base stations and other communication devices. The data processing, storage and other relevant control apparatus can be provided on an appropriate circuit board and/or in chipsets.

This feature is denoted by reference 26. Possible control functions in view of configuring the communication device for reception and/or transmission of signalling information and data by means of the data processing facility in accordance with certain embodiments will be described later in this description.

The user may control the operation of a communication device by means of a suitable user interface such as keypad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

FIG. 3 shows an example of a control apparatus 30, for example to be coupled to a base station and/or part of the base station itself. The control apparatus 30 can be arranged to provide control on use of resources for communications by communication devices that are in the service area. The control apparatus 30 can be configured to provide control functions in association with generation and communication of resource allocation information and other related information and for coordination of resource allocation for signalling and data communications by means of the data processing facility in accordance with certain embodiments described below. For this purpose the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

Figure 4:
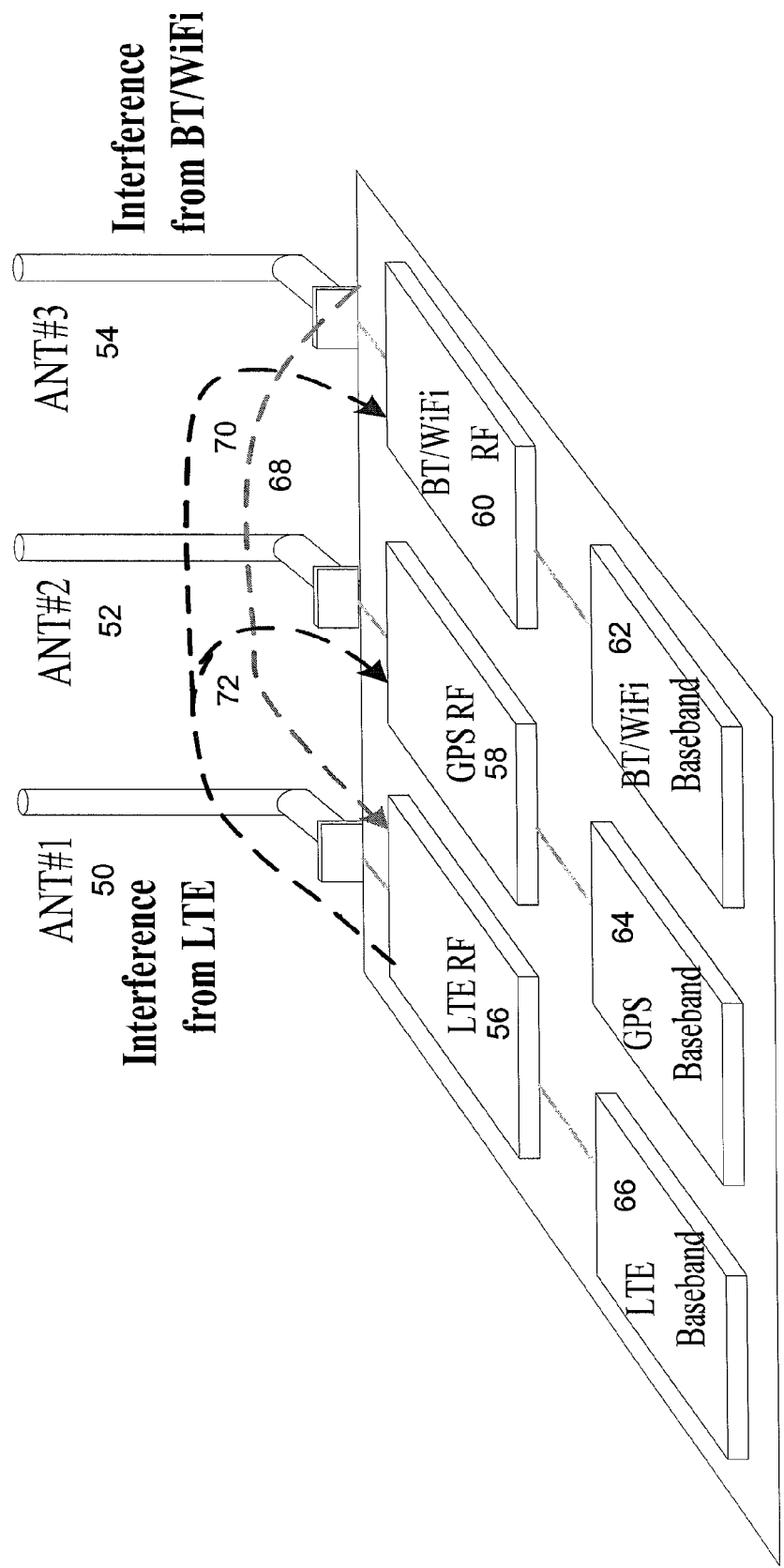
FIG. 4 shows a communication device with three transceivers.

Reference is made to FIG. 4 which shows part of the device 1 in more detail. In this example, the device 1 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth and/or Wi-Fi signals. These latter signals are referred to as ISM (industrial, scientific and medical) signals. This is in order to allow the device to access various networks and services.

The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth/Wi-Fi radio frequency processor 60 which in turn is connected to the Bluetooth/Wi-Fi baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing.

In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas.

It should be appreciated that in some embodiments, the GPS blocks may only need to receive signals.

It is possible that when LTE and ISM (which includes Bluetooth and WLAN technology) capabilities are provided in a single device, the LTE and ISM radio within the same device may be working on adjacent frequencies. This type of coexistence may cause interference. This interference between the LTE frequencies and the Bluetooth/Wi-Fi frequencies is schematically shown in FIG. 4 by arrows 68 and 70.

With the rapid increase in the number and types of GPS systems, such as GPS, A-GPS (assisted global navigation satellite system) and COMPASS, the spectrum allocation to the services is increasing. When LTE and GPS radio capabilities are provided within the same device, this may cause interference due to the adjacent operation or harmonics. The interference between the LTE and GPS systems is schematically shown by arrow 72 in FIG. 4.

Some embodiments may be implemented in an LTE system, for example the LTE-A system. Of course other embodiments may be used with other releases of the LTE standard. Yet further embodiments may be used with the standards other than the LTE standard.

Radio link failure (RLF) and Handover failure (HO failure), where the user equipment determines that a cellular connection has been is an unfortunate event that the operators of the cellular networks attempt to prevent occurring. Typically the RLF report is logged, in other words the event is noted on the user equipment and furthermore generally a report is generated within the user equipment detailing the situation of the user equipment just prior to the radio link failure/HO failure. These reports can then be forwarded to the EUTRAN where the report information has been defined and used in both Minimization of Drive Tests (MDT) and self-organised network mobility robustness optimisation (SON MRO) architectures.

In the third generation partnership project long-term evolution (3GPP LTE) MDT architecture the RLF report is required by the network to discover where there are coverage problems.

Minimization of Drive Test (MDT) has been proposed in 3GPP RAN Working Groups. In some embodiments, automatic collection of UE measurements may be defined. In some embodiments, this may enable easier monitoring of network performance and may replace expensive drive-tests performed by operators manually. This functionality requires relevant input from the terminal or UE.

The measurements made by the UE relate to the serving cell and possible neighbouring cells. These measurements may be of any suitable parameter such as signal strength of the respective cell as received at the UE. The signal strength of a reference signal, for example a pilot signal, may be measured. The UE may be arranged to provide one or more types of measurement information for one or more cells.

A UE may only performs the serving cell measurements if a serving cell signal is good enough, otherwise the UE may perform intra/inter-frequency and inter-RAT (radio access technology) measurements that are given in system information. This may be the case for Logged MDT logging and reporting.

Furthermore in 3GPP SON MRO architecture the RLF report is required by the network to discover the events surrounding any handover (HO) problems or any loss of Radio Connection with the eNB. For example the architecture uses the RLF report to determine where the handover was too late, too early or the handover was made to the wrong cell and to then optimise the handover parameters. In the following examples the RLF report is concerned with the problem of the loss of a radio link, however it would be understood that the handover problem RLF report can be handled in a similar manner according to embodiments of the application. In other words where a RLF report is discussed it would be understood that embodiments of the application apply to handover failure and/or radio link failure reporting. This is because the current standards, release 10 or R10, discuss the RLF report as recording two failure cases: radio link failure and handover failure. Therefore the term radio link failure with regards to the radio link failure report (RLF report or RLFR) should be read as a report on radio link failure and/or handover failure.

The RLF report information can comprise radio environment measurements when the radio link failure occurs, location information and cell identification values indicating the last cell identification value where the radio link failure occurred.

The accuracy of the RLF report is therefore important to the network performance evaluation. This is because where the RLF reports are used to evaluate the network performance incorrect RLF reports can cause the network to be sub-optimally organised.

As described above more and more UEs are equipped with multiple radio transceivers in order to allow users to access various networks and services ubiquitously. One resulting challenge lies in trying to avoid coexistence interference between those collocated radio transceivers as discussed in relation to FIG. 4. Consequently, In Device Coexistence (IDC) is being considered in 3GPP Rel. 10 for interference avoidance in case several radio transceivers coexist in one device.

For example ISM band UL may interfere with LTE DL reception. LTE network-controlled UE-assisted solutions may be used, for example at initiation a UE can send some information to the network to report the coexistence problems. One proposal is to send the usable/non-usable frequency bands in case FDM solution is used or TDM mode in case TDM solution is used.

In ISM band UL interfering with LTE DL reception scenario, the LTE measurements have been 'polluted' by the interference from ISM band and the measurement results of RSRP/RSRQ (reference signal received power/reference signal received quality) may not reflect the real situation of the network coverage. This may lead to the incorrect network performance evaluation which may be disadvantageous.

The inventors have appreciated that in the IDC scenario, for example in cases of 'On-going interference on the serving frequency' and 'On-going interference on non-serving frequencies', the application of MDT and RLF reports in the network should be considered.

Figure 5:
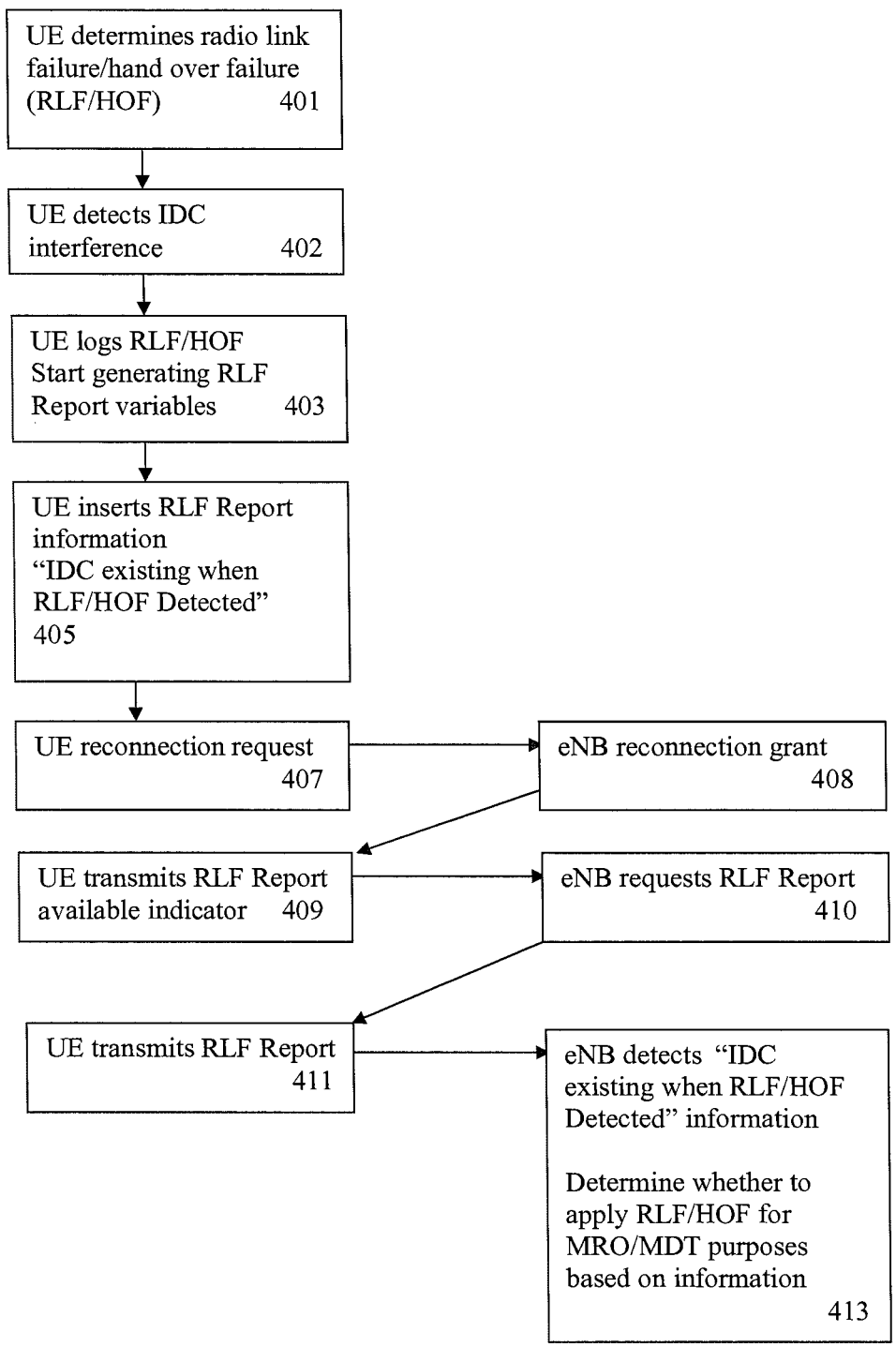
FIG. 5 shows a first flow diagram of a method using radio link failure/handover failure RLF reporting.

Reference is made to FIG. 5 which shows a method of an embodiment using and handling RLF reporting where the user equipment can determine whether the user equipment is being affected by or experiencing in device co-existence interference.

This method can be used in some embodiments where "on-going interference on the serving frequency" and/or of "on-going interference of the non-serving frequency" when radio link failure is detected.

The user equipment can in a first operation determine when radio link failure (RLF)/HO failure occurs. The radio link failure can be determined based on any suitable link failure scenario. For example radio link failure may be determined on an expiry of a timer such as a "T310" timer expiry. In some other embodiments the radio link failure can be found on determining a random access problem indication from the media access controller (MAC) whilst neither of the timers (T300, T301, T304 nor T311 are running). Furthermore in some embodiments a radio link failure can be determined upon indication from the radio link controller (RLC) that the maximum number of retransmissions has been reached. For example, HO failure may be determined on an expiry of a timer T304. It would be understood that in some embodiments the following operations can be also triggered by a handover problem.

The operation of determining the radio link failure/HO failure is shown in FIG. 5 by step 401.

Furthermore in some embodiments the user equipment can further determine whether the user equipment is being affected by or experiencing in device co-existence interference.

The operation of determining whether the user equipment is being affected by or experiencing in device co-existence interference is shown in FIG. 5 by step 402.

It would be understood that in some embodiments the determination of the user equipment experiencing IDC interference and determining or detecting the interference can be performed either shortly before, at the same time as or shortly after the determination of the radio link failure/handover failure/communications failure. In other words step 401 can occur shortly before, at the same time or shortly after step 402. It would be understood that this temporal relationship can be applied to the embodiments described with respect to FIGS. 6 to 8 as well as those with respect to FIG. 5 as discussed herein.

The user equipment can start to log the radio link failure/HO failure. In some embodiments the logging of the radio link failure/HO failure can be the user equipment data processing entity opening a file or log for storing radio link failure/HO failure variables for a RLF report. In some embodiments the user equipment can further start to generate the RLF report variables. For example RLF variables can be for example the registered public land mobile network (RPLMN) identity, the last serving cell reference signal received power (RSRP) and reference signal received quality (RSRQ) generated from measurements collected up to the moment the user equipment detected radio link failure, and the neighbouring cell identity and measurement reports for neighbouring cells for one or more of the EUTRA frequencies, neighbouring UTRA frequencies, neighbouring GERAN frequencies, and neighbouring CDMA2000 frequencies. It would be understood that the RLF report variables can be any other suitable variable which can be used to assist to determine the cause of the radio link failure/HO failure.

The initial logging of the radio link failure/hand over failure RLF/HO failure and the initial determination of the RLF report variables is shown in FIG. 5 by step 403.

In some embodiments the user equipment when operating in IDC (in device coexistence) mode can be configured to insert within the RLF report information an "IDC existing when RLF/HOF detected" indicator.

The insertion of an "IDC existing when RLF/HOF detected" or "IDC when RLF/HOF occurred" indicator into the generating or generated RLF report information values is shown in FIG. 5 by step 405.

In some embodiments the user equipment can then following the radio link failure/HO failure attempt to perform a reconnection or connection operation whereby the user equipment attempts to reconnect to a cellular network via an eNodeB (eNB) or similar base transceiver station.

The operation of generating a UE reconnection request is shown in FIG. 5 by step 407.

The eNodeB can then on detecting the UE reconnection request generate a reconnection grant.

The operation of generating the reconnection grant is shown in FIG. 5 by step 408.

In some embodiments the term reconnection refers to re-establishment and/or RRC connection setup.

In some embodiments the UE on reconnection is configured to transmit to the eNB the RLF report available indicator.

The operation of transmitting the RLF report available indicator is shown in FIG. 5 by step 409.

The eNB on detection of the RLF report available indicator can then request from the UE the RLF report that has been generated comprising the "IDC existing when RLF/HOF detected" indicator.

The operation of requesting the RLF report based on receiving the RLF indicator is shown in FIG. 5 by step 410.

The UE on receiving the RLF report request from the eNB can then be configured to transmit to the EUTRAN via the network the RLF report. As indicated herein the RLF report contains or comprises an indicator that in device co-existence (IDC) interference was being experienced by the UE or apparatus when the radio link failure (RLF)/HO failure occurred or was detected.

The operation of transmitting the RLF report including the "IDC existing when RLF/HOF detected" indicator is shown in FIG. 5 by step 411.

The eNB on detecting within the RLF report the "IDC existing when RLF/HOF detected" indicator can then further determine whether or not to apply the remainder of the RLF report variables for MRO/MDT purposes.

The operation of detecting the "IDC existing when RLF/HOF detected" information indicator and furthermore determining whether or not to apply the RLF report for MRO/MDT purposes is shown in FIG. 5 by step 413.

Figure 6:
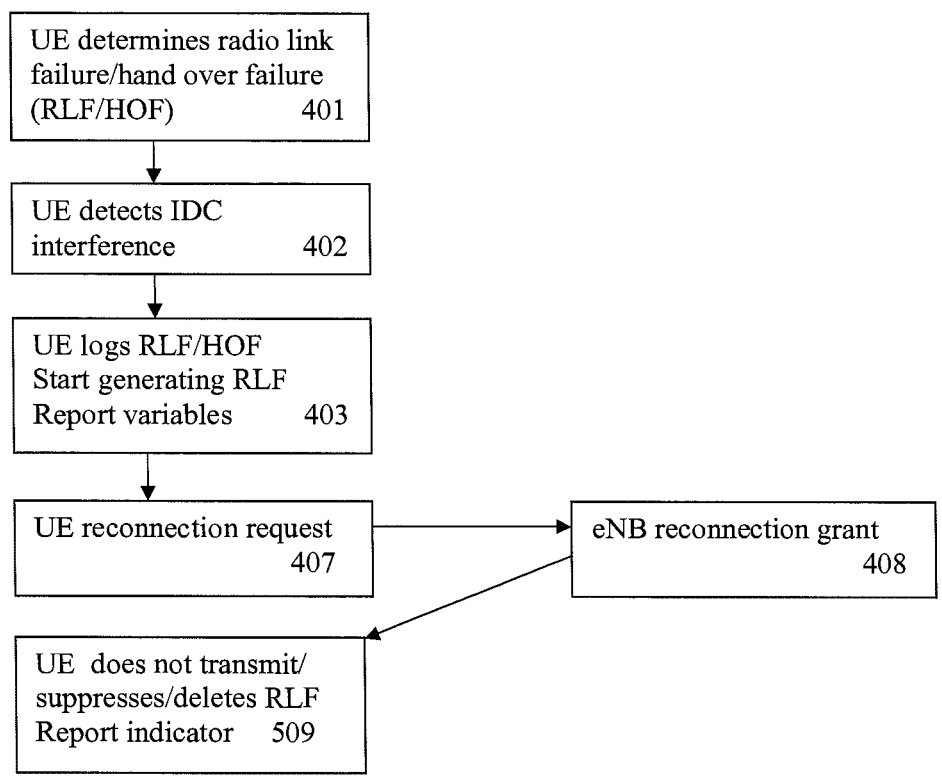
FIG. 6 shows a second flow diagram of a method using RLF reporting.

With respect to FIG. 6 a further method of an embodiment of handling radio link failure information when the user equipment is being affected by or experiencing in device co-existence interference is described.

As described herein the user equipment can determine the occurrence of a radio link failure or handover failure by any suitable means.

The operation of detecting the radio link failure/hand over failure is shown in FIG. 6 by step 401.

Furthermore in some embodiments the user equipment can further determine whether the user equipment is being affected by or experiencing in device co-existence interference.

The operation of determining whether the user equipment is being affected by or experiencing in device co-existence interference is shown in FIG. 6 by step 402.

Furthermore as described herein the user equipment can be further configured to log the radio link failure, and start to generate RLF report variables.

The operation of logging the radio link/handover failure and the initialisation of the generating of RLF report variables is shown in FIG. 6 by step 403.

Furthermore in some embodiments, as described herein the user equipment can then be configured to generate and transmit a reconnection request to the EUTRAN via an eNodeB.

The operation of the user equipment requesting reconnection is shown in FIG. 6 by step 407.

The eNodeB can furthermore as described herein grant access to the network and issue a reconnection grant.

The operation of granting the reconnection is shown in FIG. 6 by step 408.

In some embodiments the term reconnection refers to re-establishment and/or RRC connection setup.

The user equipment furthermore in some embodiments when determining that the user equipment is being affected by or experiencing in device co-existence interference can be configured to modify the RRC connection complete message to remove or reset the "information available" indicator. For example the "information available" indicator or information within RRC messages such as the RRCConnectionReestablishmentComplete, RRCConnectionSetUpComplete and RRCConnectionReconfigurationComplete can be modified to be reset or removed prior to transmission to the EUTRAN.

The operation removing the information available indicator from the RRC connection complete message is shown in FIG. 6 by step 509.

In other words the UE suppresses the transmission of a RLF report available indicator. The suppression/deletion of which causes the eNB to not request the RLF report in a manner as described herein with reference to FIG. 5.

The suppression of the transmission of the RLF report available indicator is shown in FIG. 6 by step 509.

Thus in these embodiments the radio link/handover failure is logged at the user equipment but the eNodeB does not receive nor request the full set of RLF report variables and so does not use the variables to modify the network where the issue may be one of IDC interference.

Figure 7:
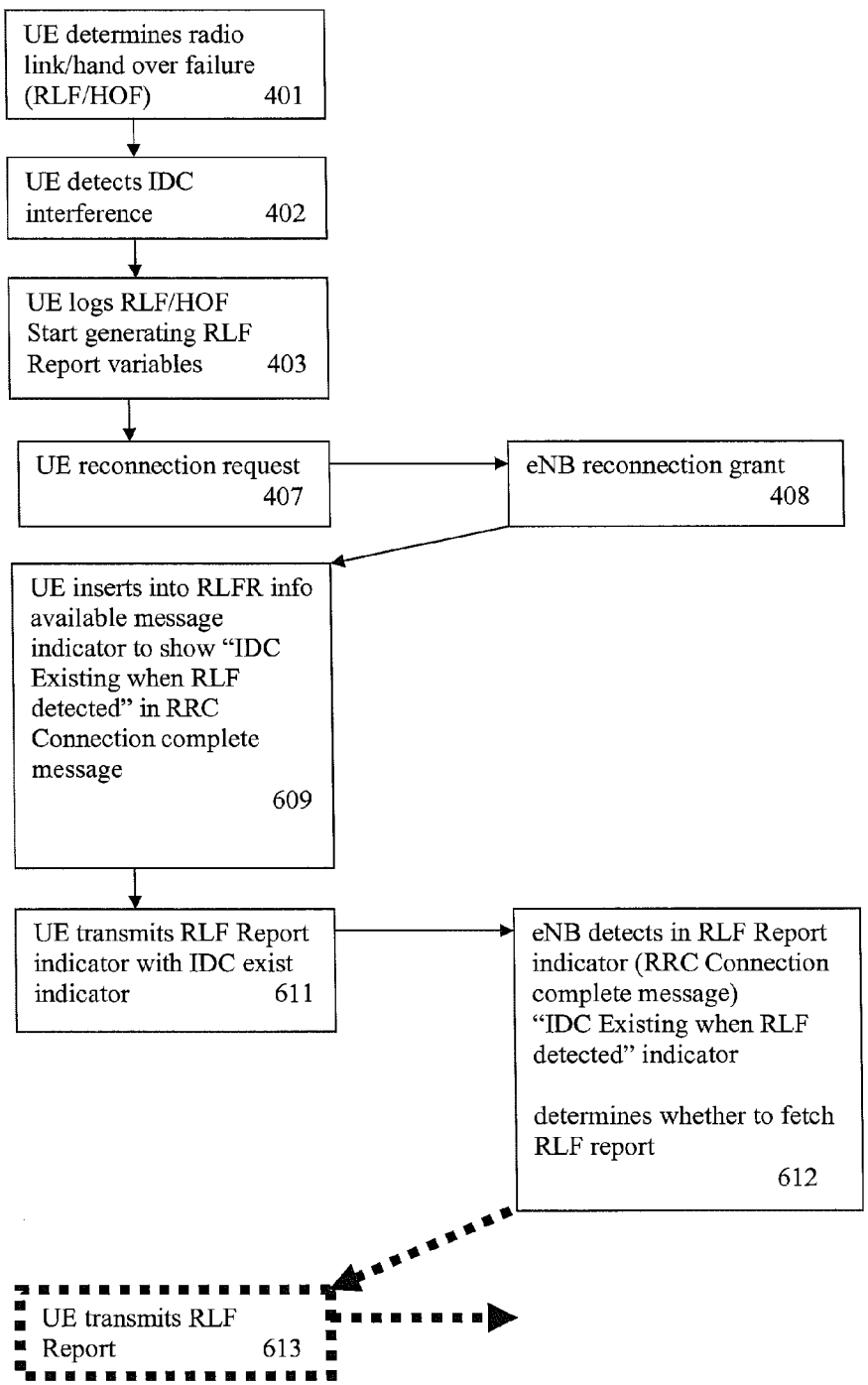
FIG. 7 shows a third flow diagram of a method using RLF reporting.

With respect to FIG. 7 a further example of handling RLF report during user equipment being affected by or experiencing in device co-existence interference is described.

As described herein the user equipment can determine the occurrence of a radio link/handover failure by any suitable means.

The operation of detecting the radio link failure is shown in FIG. 7 by step 401.

Furthermore in some embodiments the user equipment can further determine whether it is being affected by or experiencing in device co-existence interference.

The operation of determining or detecting the user equipment is being affected by or experiencing in device co-existence interference is shown in FIG. 7 by step 402.

Furthermore as described herein the user equipment can be further configured to log the radio link failure/handover failure, and start to generate RLF report variables.

The operation of logging the radio link/handover failure and the initialisation of the generating of RLF report variables is shown in FIG. 7 by step 403.

Furthermore in some embodiments, as described herein the user equipment can then be configured to generate and transmit a reconnection request to the EUTRAN via an eNodeB.

The operation of the user equipment requesting reconnection is shown in FIG. 7 by step 407.

The eNodeB can furthermore as described herein grant access to the network and issue a reconnection grant.

The operation of granting the reconnection is shown in FIG. 7 by step 408.

In some embodiments the term reconnection refers to re-establishment and/or RRC connection setup.

The user equipment can in some embodiments insert into the RRC connection complete message, within the radio link failure information available section or information an "IDC existing when RLF/HOF detected" indicator.

In other words the data processor can edit any suitable RRC connection complete message (RRCConnectionRestablishmentComplete, RRCConnectionSetUpComplete and RRCConnectionReconfigurationComplete) RLF information available part to include a flag or indicator that when the RLF/HOF occurred that the apparatus being affected by or experiencing in device co-existence interference. In some embodiments this can be to extend the RLF report available indicator, currently a Boolean to be two Boolean. In some embodiments the IDC existing when RLF/HOF detected indicator can be a new or separate indicator associated and passed with the RLF report available indicator to the eNB.

The operation of editing the RRC connection complete message is shown in FIG. 7 by step 609.

The user equipment can transmit the RRC connection complete message, a RLF report available indicator with (or associated with) the IDC existing when RLF/HOF detected indicator to the eNodeB.

The operation of transmitting the RLF report available indicator with the IDC existing when RLF/HO detected indicator to the eNB is shown in FIG. 7 by step 611.

The eNB can on detecting the RLF report indicator with the IDC existing when RLF/HOF detected indicator (RRC connection complete message) then be configured to examine or determine whether or not it contains an active "IDC existing when RLF/HOF detected" indicator.

In some embodiments when the eNB detects within the RRC connection complete message an "IDC existing when RLF/HOF detected" indicator the eNB can be configured to determine whether or not to request or process the RLF report from the user equipment.

The operation of detecting in the RRC connection complete message an "IDC existing when RLF/HOF detected" indicator and determining whether or not to request and/or process the full RLF report depending on the indicator being present is shown in FIG. 7 by step 612.

The eNB can then for example request from the UE the RLF report. The UE on receiving the RLF report request from the eNB can then be configured to transmit to the EUTRAN via the network the RLF report.

This optional operation is shown in FIG. 7 by the dashed step 613.

Figure 8:
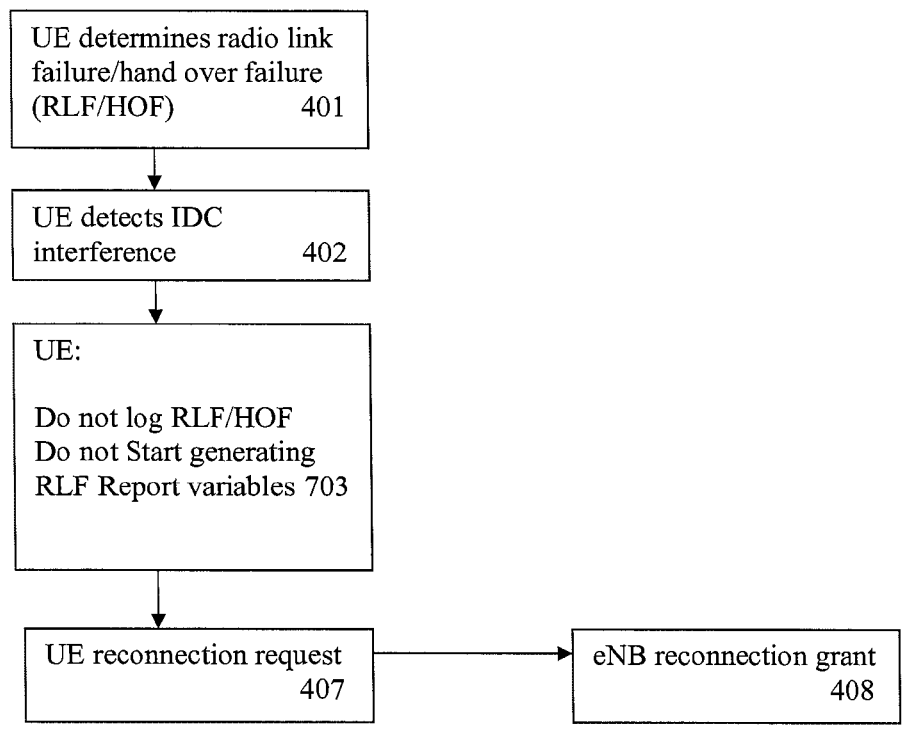
FIG. 8 shows a fourth flow diagram of a method using RLF reporting.

In some embodiments and with respect to FIG. 8 a further example of embodiments of handling RLF report when the user equipment is being affected by or experiencing in device co-existence interference is further described.

As described herein the user equipment can determine the occurrence of a radio link failure/handover failure by any suitable means.

The operation of detecting the radio link failure/handover failure is shown in FIG. 8 by step 401.

Having determined the radio link failure the user equipment can be then configured to determine that when the user equipment is operating IDC then the radio link failure/handover failure is not to be logged, and furthermore that RLF report variables are not to be generated.

The operation of not logging or suppressing the the radio link failure/handover failure and the initialisation of the generating of RLF report variables is shown in FIG. 8 by step 703.

Furthermore in some embodiments, as described herein the user equipment can then be configured to generate and transmit a reconnection request to the EUTRAN via an eNodeB.

The operation of the user equipment requesting reconnection is shown in FIG. 8 by step 407.

The eNodeB can furthermore as described herein grant access to the network and issue a reconnection grant.

The operation of granting the reconnection is shown in FIG. 8 by step 408.

By not logging the RLF/HOF there is no information to be passed to the EUTRAN for further processing which could generate sub-optimal network planning.

It would be understood that in some embodiments the eNB can be configured to select or determine how RLF reports are to be processed/generated/logged according to embodiments of the application and furthermore communicate this configuration or determination of report generation operation to the user equipment operating within the eNB range.

It should be noted that different embodiments have been described. It should be appreciated that two or more embodiments or parts of two or more embodiments may be combined.

One or more of the steps performed by the apparatus of the base station and/or apparatus of the UE may be performed when one or more associated instructions are run on one or more of the processors. It should be appreciated that the one or more associated instructions may be stored in one or more memories of the base station.

Whilst embodiments have been described in relation to the LTE systems, it should be appreciated that embodiments can be used in conjunction with any other suitable standard. For example, embodiments may be used in a UMTS environment. In this alternative, the messages may be UMTS messages.

It is noted that whilst embodiments may have been described in relation to user equipment or communication devices such as mobile terminals, embodiments may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. In some embodiments, there may be the possibility to download the program code product via a data network.

Some embodiments may be implemented as a chipset, in other words a series of integrated circuits communicating among each other. The chipset may comprise microprocessors arranged to run code, application specific integrated circuits (ASICs), and/or programmable digital signal processors for performing the operations described above.

Embodiments may be practiced in various components such as integrated circuit modules.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method comprising:
   detecting a communications failure in a communications device;
   after detecting the communications failure, determining whether in-device co-existence interference existed when the communications failure was detected;
   generating a failure report on the communications failure;
   inserting an indication of in-device coexistence interference into the failure report when in-device co-existence interference existed when the communications failure was detected;
   requesting a radio link reconnection from a further device;
   receiving a reconnection grant from the further device;
   indicating the availability of the failure report to the further device;
   receiving a request for the failure report from the further device; and
   transmitting the failure report to the further device, when the failure report does not include the indication of in-device co-existence interference.

2. The method as claimed in claim 1, wherein the failure report comprises at least one failure variable.

3. The method as claimed in claim 2, wherein the at least one failure variable comprises an indicator associated with the determination of in-device co-existence interference during the communications failure of the device.

4. The method as claimed in claim 1, further comprising:
   amending a failure report available indicator to reset and/or to remove the failure report information available indicator; and/or
   suppressing the transmission of the failure report available indicator.

5. The method as claimed in claim 1, further comprising:
   extending a failure report available indicator by a bit, the bit configured to indicate the determination of in-device co-existence interference during the communications failure of the device; and
   transmitting the amended failure report available indicator.

6. The method as claimed in claim 1, further comprising:
   generating an in-device co-existence interference indicator; and
   transmitting the in-device co-existence interference indicator with a failure report available indicator.

7. The method as claimed in claim 1, further comprising:
   stopping generation and storage of any failure report variable indicating that in-device co-existence interference existed when the communications failure was detected.

8. The method as claimed in claim 1, wherein generating a failure report on the communications failure depends on a reporting indicator from a further device.

9. A method comprising:
   receiving a request for a radio link reconnection from a communication device;
   sending a reconnection grant to the communication device;
   receiving an indication of the availability of a failure report on a communications failure from the communications device;
   requesting the failure report from the communications device;
   receiving the failure report;
   determining from the failure report at least one failure variable, the at least one failure variable comprising an indicator of in-device co-existence interference during the communications failure of the communications device;
   omitting the failure report from at least one of minimization of drive tests (MDT) and self-organized network mobility robustness optimization (SON MRO), when the at least one failure variable includes the indicator that in-device co-existence interference existed when the communications failure of the communications device was detected.

10. A computer program product comprising a non-transitory computer-readable storage medium bearing computer program code embodied therein for use with a computer, the computer program code comprising code for performing the method of claim 1.

11. An electronic device comprising:
    at least one processor; and
    at least one memory including computer program code, the at least one memory and computer program code configured, with the at least one processor, to cause the electronic device to perform:
    detecting a communications failure in the electronic device;
    after detecting the communications failure, determining whether in-device co-existence interference existed when the communications failure was detected;
    generating a failure report on the communications failure;
    inserting an indication of in-device coexistence interference into the failure report when in-device co-existence interference existed when the communications failure was detected;
    requesting a radio link reconnection from a further device;
    receiving a reconnection grant from the further device;
    indicating the availability of the failure report to the further device;
    receiving a request for the failure report from the further device; and transmitting the failure report to the further device, when the failure report does not include the indication of in-device co-existence interference.

12. The electronic device as claimed in claim 11, wherein the failure report comprises at least one failure variable.

13. The electronic device as claimed in claim 12, wherein the at least one failure variable comprises an indicator associated with the determination of in-device co-existence interference during the communications failure of the device.

14. The electronic device as claimed in claim 11, wherein the at least one memory and computer program code are further configured, with the at least one processor, to cause the electronic device to perform:
   amending a failure report available indicator to reset and/or to remove the failure report information available indicator; and/or
   suppressing the transmission of the failure report available indicator.

15. The electronic device as claimed in claim 11, wherein the at least one memory and computer program code are further configured, with the at least one processor, to cause the electronic device to perform:
   extending a failure report available indicator by a bit, the bit configured to indicate the determination of in-device co-existence interference during the communications failure of the device; and
   transmitting the amended failure report available indicator.

16. The electronic device as claimed in claim 11, wherein the at least one memory and computer program code are further configured, with the at least one processor, to cause the electronic device to perform:
   generating an in-device co-existence interference indicator; and
   transmitting the in device co-existence interference indicator with a failure report available indicator.

17. The electronic device as claimed in claim 11, wherein the at least one memory and computer program code are further configured, with the at least one processor, to cause the electronic device to perform:
   stopping generation and storage of any failure report variable indicating that in-device co-existence interference existed when the communications failure was detected.

18. The electronic device as claimed in claim 11, wherein generating a failure report on the communications failure depends on receiving a reporting indicator from a further device and on determining the state of the reporting indicator.

19. An electronic device comprising:
   at least one processor; and
   at least one memory including computer program code, the at least one memory and computer program code configured, with the at least one processor, to cause the electronic device to perform:
   receiving a request for a radio link reconnection from a communication device;
   sending a reconnection grant to the communication device;
   receiving an indication of the availability of a failure report on a communications failure from the communications device;
   requesting the failure report from the communications device;
   receiving the failure report;
   determining from the failure report at least one failure variable, the at least one failure variable comprising an indicator of in-device co-existence interference during the communications failure of the communications device;
   omitting the failure report from at least one of minimization of drive tests (MDT) and self-organized network mobility robustness optimization (SON MRO), when the at least one failure variable includes the indicator that in-device co-existence interference existed when the communications failure of the communications device was detected.

20. The electronic device as claimed in claim 11, wherein the electronic device is a user equipment.

21. The electronic device as claimed in claim 19, wherein the electronic device is a node B.

* * * * *